US008386927B1

(12) United States Patent
Franklin et al.

(10) Patent No.: US 8,386,927 B1
(45) Date of Patent: Feb. 26, 2013

(54) GRAVITY-BASED LINK ASSIST

(75) Inventors: Patrick G Franklin, Ravensdale, WA (US); Jonathan Ian McCormack, Los Altos, CA (US)

(73) Assignee: Amazon Technologies, Inc., Reno, NV (US)

( * ) Notice: Subject to any disclaimer, the term of this patent is extended or adjusted under 35 U.S.C. 154(b) by 167 days.

(21) Appl. No.: 12/789,157

(22) Filed: May 27, 2010

(51) Int. Cl.
*G06F 3/01* (2006.01)
*G06F 3/048* (2006.01)
*G06F 3/033* (2006.01)

(52) U.S. Cl. ......... 715/701; 715/787; 715/857; 715/863
(58) Field of Classification Search .................. 715/701, 715/787, 857, 863
See application file for complete search history.

(56) References Cited

U.S. PATENT DOCUMENTS

| | | | | |
|---|---|---|---|---|
| 5,508,717 | A * | 4/1996 | Miller | 715/858 |
| 6,125,385 | A * | 9/2000 | Wies et al. | 709/203 |
| 6,636,161 | B2 * | 10/2003 | Rosenberg | 341/20 |
| 7,299,321 | B2 * | 11/2007 | Braun et al. | 711/154 |
| 7,543,248 | B2 * | 6/2009 | Denoue et al. | 715/863 |
| 7,573,462 | B2 * | 8/2009 | Ouchi | 345/157 |
| 7,631,278 | B2 * | 12/2009 | Miksovsky et al. | 715/857 |
| 7,886,236 | B2 * | 2/2011 | Kolmykov-Zotov et al. | 715/863 |
| 8,059,099 | B2 * | 11/2011 | Lampell et al. | 345/173 |
| 8,136,052 | B2 | 3/2012 | Shin et al. | |
| 2007/0192749 | A1 * | 8/2007 | Baudisch | 715/863 |
| 2008/0168364 | A1 * | 7/2008 | Miller et al. | 715/762 |
| 2009/0015550 | A1 * | 1/2009 | Koski | 345/157 |
| 2009/0213086 | A1 | 8/2009 | Chae et al. | |
| 2011/0072399 | A1 * | 3/2011 | Kim et al. | 715/858 |
| 2011/0102314 | A1 * | 5/2011 | Roux | 345/156 |
| 2011/0185316 | A1 | 7/2011 | Reid et al. | |

OTHER PUBLICATIONS

Non-Final Office Action for U.S. Appl. No. 12/789,119, mailed on May 24, 2012, Patrick G. Franklin et al., "Touch Input Assist ", 22 pages.

* cited by examiner

*Primary Examiner* — David Phantana Angkool
(74) *Attorney, Agent, or Firm* — Lee & Hayes, PLLC

(57) ABSTRACT

A user interface of an electronic content rendering device implements gravity-based link assist to enhance user experience when browsing linked content. As a user moves a pointer along a trajectory across various links and objects, gravitational fields surrounding the links and objects provide a pulling effect that draws the pointer toward these fields. Responsive to pointer deceleration being detected when the pointer resides within a gravitational field, the link assist repositions the pointer to a center of the link or object relative to the trajectory of the pointer within the field.

44 Claims, 11 Drawing Sheets

GRAVITY-BASED LINK ASSIST

BACKGROUND

Portable electronic devices, such as gaming devices, mobile communication devices, portable media players, portable digital assistants (PDAs), electronic book (eBook) reader devices, and the like, are becoming increasingly popular. These devices often include a screen for visually conveying information to a user. Users of such portable electronic devices can provide input via a user interface, using a pointer to select, for example, an object or link on the screen. Affirmation that the user input has been received and applied to the selected object or link is typically manifest visually on the screen by such techniques as highlighting or changing the color of the object of the link or by altering the visual representation of the pointer. In devices that employ display with a relatively short refresh time (e.g., a cathode ray tube (CRT) display, a liquid crystal display (LCD), etc.), the visual confirmation is provided almost immediately after the user provides the input.

However, some devices employ displays that do not have comparatively fast refresh times. Such displays, like an electronic paper display employed in eBook reader devices, often do not provide the same immediacy of input feedback. Instead, there may be a perceptible delay between when a user provides input and when that input is visually displayed on the screen. This delay can be confusing to users, because they are not sure whether the device registered their input at all. Complicating matters is that some of these same displays employ larger pixel granularity. As a result, it may be more difficult to identify the location of the user's intended input on the screen. In some extreme cases, the user may unintentionally activate a different object or link. This can be frustrating to users, because they are not sure why the device registered their input in that way, and it may take multiple additional inputs to unwind the incorrect selection.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
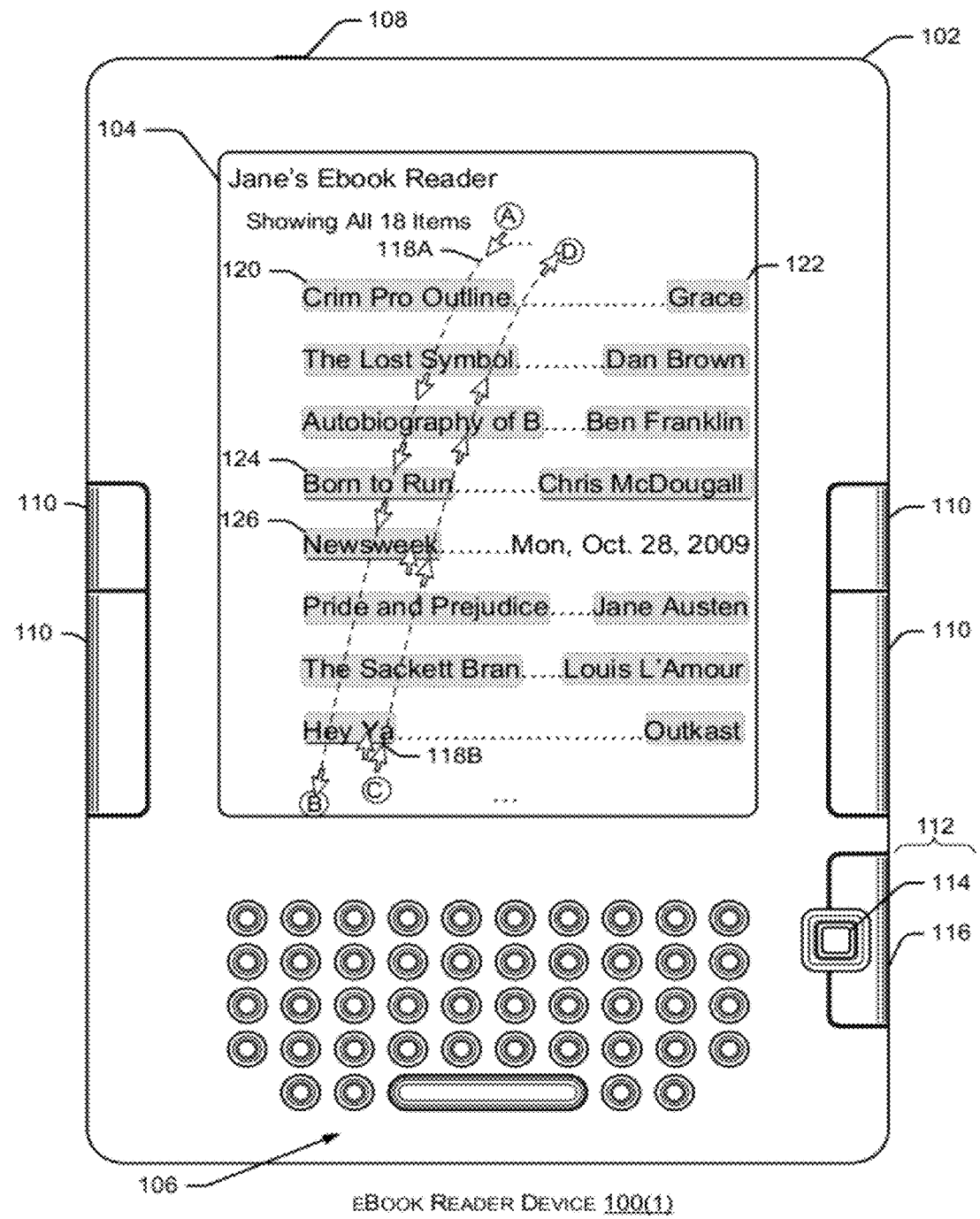
FIGS. 1 and 2 illustrate an electronic device, in the form of an electronic book (eBook) reader device, which may implement gravity-based link assist techniques. An illustrative screen rendering of an exemplary user interface is provided on the device's display to demonstrate aspects of the link assist techniques.

This disclosure describes an architecture and techniques in which a user interface of an electronic content rendering device employs gravity-based link assist to enhance user experience when browsing linked content. The linked content may include various types of digital content, such as music, movies, images, electronic books, periodicals, and so on. Moreover, the linked content may be local, e.g., stored on the electronic device, or remote and accessible via a network. The content rendering device may be embodied in many ways, such as an electronic book (eBook) reader device, a mobile communication device, personal digital assistant (PDA), portable media player, tablet computer, netbook, and the like. However, in specific implementations described below, the content rendering device is a dedicated handheld eBook reading device ("eBook reader device" or simply "eBook reader") that uses gravity-based link assist to enhance user experience while the user browses linked content on an eBook reader device.

As discussed above, for electronic devices employing a display with a relatively long refresh rate (e.g., update times of at least about 15 milliseconds), there may be a perceptible delay between when a user provides input and when that input is visually presented on the display. This delay can be confusing to users, because they may be unsure whether the device registered their input. In some instances, a user who is unsure about whether input was received may reenter the input multiple times, possibly resulting in multiple and/or unintended actions being performed by the eBook reader device.

As used herein "refresh rate" refers to the time it takes to update or refresh data displayed on a display screen. Refresh rate refers to the time to update a display and may include a full display frame update, in which all or substantially all of the data displayed on a display screen is refreshed, or a partial display frame update, in which only a portion (e.g., a menu or other localized region) of the display screen is refreshed. Additionally, for some devices, the granularity of the display and correspondingly larger distances covered by user input may cause a pointer to appear to skip over an intended link.

This disclosure describes various illustrative techniques for enhancing user experience during operation of an electronic device. The illustrated techniques include enhancing user experience by confirming receipt of user input by providing pointer gravity feedback, by improving user target acquisition by employing gravity-based link assist, or by otherwise enriching the user experience. Gravity-based link assist may be used to provide visual confirmation of the user's input more quickly, thereby removing uncertainty in the mind of the user about whether an input was received. In at least some implementations, the gravity-based link assist may be provided more quickly than a display update time of the electronic device.

While techniques for gravity-based link assist are described in the context of portable electronic devices having displays with relatively long display update times, such as electronic paper displays, the techniques described herein are also applicable to devices having displays with shorter display update times. In that case, the gravity-based link assist may be provided substantially contemporaneously with visual feedback. Moreover, while the techniques are described in the context of portable electronic devices, the techniques are also applicable to other electronic devices, such as laptop and desktop computers, set-top-boxes, game consoles or controls, televisions, appliances, audio/video equipment, and the like.

Illustrative Electronic Device

FIG. 1 shows an example of one illustrative electronic device, eBook reader device 100(1), which is capable of employing gravitation link assist to enhance user experience. Although in the illustrated implementation the electronic device 100(1) is embodied as a handheld electronic book (eBook) reader device, virtually any other type of electronic device may be used and may be configured to provide gravity-based link assist as will be described below in more detail. As such, the electronic devices equipped with gravitation link assist are generally labeled with a reference 100, and specific types of devices are identified with extensions (1), (2), etc., as represented by the eBook reader device 100(1) of FIG. 1.

As shown in FIG. 1, the eBook reader device 100(1) has a body or housing 102, a display 104 for displaying information to a user via a graphical user interface, and a user interface made up of various mechanisms. In this example, the display 104 comprises an electronic paper display, such as those made by eInk Corporation of Cambridge, Mass. The user interface comprises a variety of mechanism for users to interact with the device 100(1) including a keypad 106, an on/off slider 108, multiple buttons 110, and a user input cluster 112 including a joystick 114 and a pivot button 116. In some implementations, the display 104 may also comprise a user input mechanism in the form of a touch screen, with soft keys that may replace or complement the physical input mechanisms. Further, one or more of the buttons, input cluster, or joystick may be omitted or replaced such as by a mouse, eraser pointer, touch pad, or another user input mechanism.

In the illustrated eBook reader device 100(1), the keypad 106 includes a plurality of alphabetic, numeric, and/or function keys for entry of user input. The on/off slider 108, as its name suggests, allows users to turn at least some systems of the device 100 on or off. However, power to some systems of the device may be controlled independently of the on/off switch. Buttons 110 allow users to turn pages forward and back within an eBook and go to a home page. The joystick 114 allows users to select textual links and objects on the display and perform other selection and navigation options presented by various screen renderings. Pivot button 116 allows users to perform other actions, such as open menus, navigate back, and undo selections.

Using an electronic paper screen as the display 104 reduces the power consumption of the electronic device 100(1), thereby extending battery life. Electronic paper displays also provide a very easy to read display that resembles an actual printed page of text. However, as mentioned above, electronic paper displays tend to have a longer display update time than other types of displays, such as cathode ray tube (CRT) displays and liquid crystal displays (LCDs). For example, electronic paper displays may have a display update time greater than about 15 milliseconds. Typically, electronic paper displays have display update times greater than about 100 milliseconds, and in some implementations, displays may have display update times greater than about 250 milliseconds.

The user interface (UI) allows users to display and navigate through a collection of media items. In various implementations such media items include one or more of eBooks, web pages, audio files, video files, games, programs, and/or other electronic items. Moreover, such media items may be stored locally or remote from the eBook reader device 100(1). As used herein, the term eBook includes electronic copies of books, magazines, newspapers, maps, publications, and the like. The UI provides a cursor or pointer to facilitate user navigation. FIG. 1 shows a pointer rendered at various instances in time at various locations along respective trajectories 118A and 118B. Users may control the pointer by a mechanism, such as joystick 114, to select, highlight, and/or modify text or other items on the display.

The UI further employs a pointer gravity application to implement gravity-based link assistance for user selection of links. Pointer gravity parameters may be individually configured for acceleration and deceleration. For example, acceleration represents the force exerted to leave a gravitational field whereas deceleration may represent a recognized decrease in speed within a gravitational field.

FIG. 1 illustrates an eBook reader device 100(1) belonging to "Jane." Jane's eBook reader has multiple content items. On Jane's device we can see that not all of her 18 items are shown. Her items include a document titled "Crim Pro Outline," several eBooks including "The Lost Symbol," the "Autobiography of Benjamin Franklin," and "Born to Run" as well as the eMagazine "Newsweek."

In the example of FIG. 1, gravitational fields are illustrated for purposes of explanation as a gray area surrounding each navigation element or "clickable" link. For example, gravitational field 120 surrounds a link for "Crim Pro Outline," while gravitational field 122 surrounds a link for "Grace" who provided the Crim Pro Outline. In practice, the gravitational fields may not be visible to the user at all. In other instances, gravitational fields may be presented when a pointer enters a field with the pointer.

In at least one implementation, clicking to activate a link is a pointer gravity parameter that results in activation of a pointer gravity application and the pointer being repositioned in the middle of the link along the path the pointer was traveling. Additionally, the link may be presented with an underline when the pointer enters the gravitational field. In the examples illustrated by FIG. 1, for the trajectory 118A from point "A" to point "B" the pointer is depicted decelerating in the fields 124 and 126 for the links corresponding to the "Born to Run" and "Newsweek," as represented pictorially by the underlines becoming visible for those links. In other instances, deceleration of the pointer is registered when the pointer enters a gravitational field. In such instances, deceleration within the gravitational field is a recognized parameter for activating the pointer gravity application.

Pointer gravity parameters may be predetermined or user configurable to set a threshold distance from a clickable link where a gravitational field becomes active. The rate of deceleration for gravitational field activation may also be predetermined or configurable by the user and may differ for various types of links. For example, links represented by images may have a stronger gravitational pull than that of textual links.

In various implementations, a user may configure types of links to have either weaker or stronger relative gravity in accordance with the user's preference for the type of media represented or the particular item. For example, suppose user "Jane" assigns a high gravity to the link pertaining to the content item "Crim Pro Outline" provided by Grace, because Jane is preparing for an upcoming Criminal Procedure exam in law school. However, once the exam is completed, Jane may assign a lower gravity. As another example, a high gravity may be set for links to eBooks that the user is currently reading, and lowered when the user finishes the eBooks. When a link has weaker gravity, the pointer may move through the region or field with less delay, and may even appear to skip over the link more quickly, than in comparison to pointer movement through links with stronger associated gravity.

As illustrated, a pointer beginning at point "A," may follow a trajectory 118A from point "A" to point "B" toward the bottom of the display 104. Similarly, albeit not simultaneously, a pointer beginning at point "C," may follow a trajectory 118B from point "C" to point "D" toward the top of the display 104. Along a trajectory, when a pointer decelerates within a gravitational field of a navigation element, gravity-based link assist automatically positions the pointer at the assisted-center of the associated link. For instance, as the pointer moves across the link for the eBook "Born to Run" in the trajectory 118A, the pointer is automatically placed at the assisted-center of the link. This automatic assistance enhances the experience of a user who may otherwise become frustrated with selecting an undesired link or not being able to select a link in a desired location because of pixel granularity or other reasons. Such automatic assistance is discussed in greater detail with regard to FIG. 2, below.

In some implementations, the assisted-center position is automatically selected based on a comparison of the gravitational field and the trajectory such that the assisted-center is in the middle of the gravity field along the trajectory irrespective of the middle as determined with relation to the trajectory. In other instances, the assisted-center position is the middle of the gravitational field. In still other instances, the assisted-center position is a location relative to the gravitational field and the trajectory that is a calculated distance toward the middle of the gravitational field without leaving the original trajectory by more than a calculated distance. Other techniques are contemplated to determine assisted-center position for some implementations.

Figure 2:
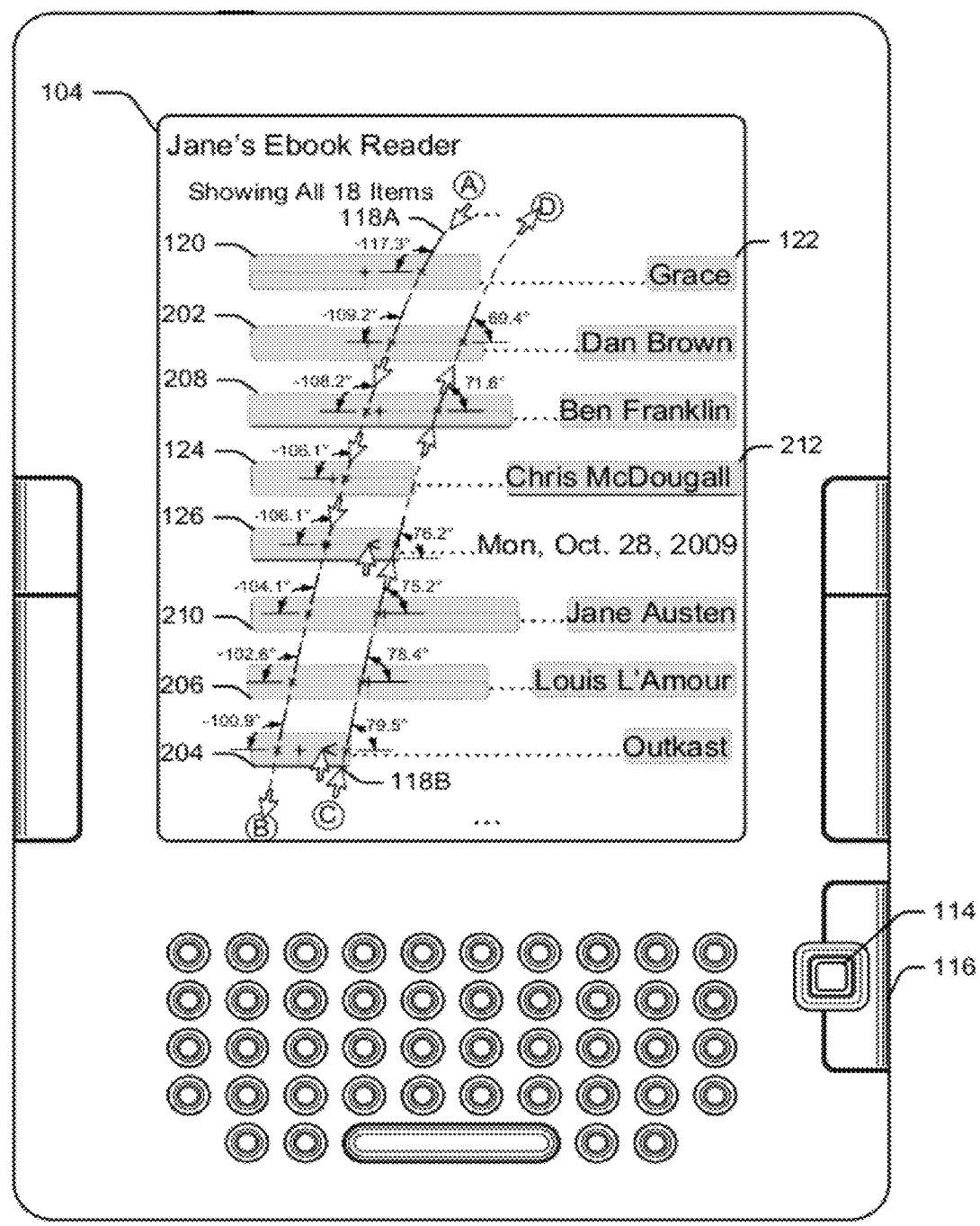

FIG. 2 shows essentially the same UI as that shown in FIG. 1, but is altered to remove the text of the various links along the left-hand side, leaving just the grayed area representing the gravitational field. Centers of the visible portion of the links are signified with a plus symbol "+" whereas assisted-center positions along the trajectories 118A and 118B are demarcated with the letter "x," and assisted-center positions shifted from the trajectory toward the center "+" in are signified with a less-than symbol "<." Situations where the center of the visible portion of the link corresponds to the assisted-center position have been illustrated with an asterisk "*" to denote alignment of the plus symbol "+" and the letter "x." It is first noted that the center "+" represents both the vertical and horizontal center of the gravitational field for the visible portion of the link. In contrast, the assisted-center position "x" represents the horizontal or vertical center of the gravitational field along the trajectory. The assisted-center position "<", meanwhile, represents a position shifted from the trajectory toward the horizontal and/or vertical center "+" in situations when the assisted center along the trajectory is calculated as being too close to an edge to be satisfying to a user. That is, the techniques may pull the pointer towards a center of a field in instances, where the assisted-center along the trajectory is too near the border of the field. By doing so, the techniques more clearly illustrate to the user that the pointer is actually within the field rather than adjacent to or straddling a border of the field.

FIG. 2 presents two roughly parallel arc-shaped trajectories 118A and 118B. As illustrated, the pointer follows the first trajectory 118A from point "A" close to the top of the display 104, down and to the left toward point "B." The pointer also follows the second trajectory 118B from point "C" close to the bottom of the screen, up and to the right toward point "D." One way of understanding the trajectories references the movement of a pointer with respect to the gravitational fields over which it crosses. As illustrated, in a downward motion negative angles are illustrated respective to a horizontal representation of the gravitational fields crossed. Similarly, in an upward motion positive angles are illustrated respective to a horizontal representation of the gravitational fields crossed. In FIG. 2, several examples of pointers passing over gravitational fields are presented. For example, the first gravitational field that the pointer passes over in trajectory 118A is gravitational field 120 followed by gravitational field 202. By contrast, the pointer does not pass over gravitational field 120 in trajectory 118B, and gravitational field 202 is the last gravitational field that the pointer is illustrated traversing before reaching point "D."

As mentioned above, in various implementations the assisted-center position may be in the middle of the gravity field along the trajectory. In other instances, the assisted-center position is the middle of the gravitational field. In still other instances, the assisted-center position is a location relative to the gravitational field and the trajectory that is a calculated distance toward the middle of the gravitational field without leaving the original trajectory by more than a calculated distance.

More particularly, the trajectory of the pointer, beginning at point "A" and moving toward point "B" in FIG. 2 approximates a −107 degree path across the display 104. In this example, the negative value indicates a relative right to left downward motion. Thus, when a user decelerates the pointer within the gravity field 120, the pointer is automatically placed at an assisted-center associated with the current −117.3 degree path. In the first implementation described above, the assisted-center for the pointer on its trajectory across gravity field 120 is along the current −117.3 degree path at the location marked with an "x." In the second example, the assisted-center for pointer 118A on its trajectory across gravity field 120 is at the location marked with a "+." Additionally, for the third example, (not shown), the assisted-center for pointer 118A on its trajectory across gravity field 120 would be between the first and second examples, at a location based on a predetermined distance from the trajectory. In some instances the third example is activated responsive to the assisted-center for a pointer on a trajectory across a gravity field being calculated as too close to an edge of the gravity field to be satisfying to a user, while in other instances the third example is activated based on close proximity of the "x" and the "+." As the pointer continues along the trajectory 118A from point "A" toward point "B," when a user decelerates pointer 118A within the gravity field 202, the pointer is automatically placed at an assisted-center associated with the current −109.2 degree path. In accordance with the examples discussed above, the assisted-center for the pointer on its trajectory across gravity field 202 may be at the location marked with an "x," a "+," or between the "x" and the "+."

Where the trajectory 118A of pointer enters gravity field 124, the pointer is automatically placed at an assisted-center associated with the current −106.1 degree path. In some instances the proximity of the "x" and the "+" may trigger the pointer 118A being placed between the "x" and the "+" as in the third example described above. Note that the assisted-center position implemented for each link need not be the same assisted-center position. For example, while traveling on the illustrated trajectory 118A, the pointer may be placed at the "x" assisted center upon deceleration within gravitational fields 120 and 202, while it may be placed at an assisted center between the "x" and the "+" or at the "+" upon decelerating within gravitational field 124. Where the trajectory 118A of the pointer enters gravity field 126 presents an example of a situation where the center of the visible portion of the link corresponds to the assisted-center position. The pointer is automatically placed at an assisted-center associated with the current −106.1 degree path, which is illustrated with an asterisk "*" to denote alignment of the plus symbol "+" and the letter "x."

Similarly, as shown by the trajectory 118B, beginning at "C" and moving toward point "D" in FIG. 2, the path approximates a 73 degree path across the display 104. In this example, the positive value indicates a relative left to right upward motion, although the paths of pointer 118A and 118B are roughly parallel.

Thus, when a user decelerates the pointer within the gravity field 204, the pointer is automatically placed at an assisted-center associated with the current 79.5 degree path. In the first implementation described above, the assisted-center for the pointer on its trajectory across gravity field 204 is along the current 79.5 degree path at the location marked with an "x," even though this location is only slightly within gravitational field 204. Such an implementation may be preferred to avoid shocking the user with unexpected movements of the pointer outside of their current trajectory.

In the second example, the assisted-center for the pointer on its trajectory 118B across gravity field 204 is at the location marked with a "+." Additionally, for the third example, marked with a "<," the assisted-center for the pointer on its trajectory 118B across gravity field 204 is between the first and second examples, at a location based on a predetermined distance from the trajectory. As the pointer continues along the trajectory 118B from point "C" toward point "D," when a user decelerates the pointer within the gravity field 206, the pointer is automatically placed at an assisted-center associated with the current 78.4 degree path. In accordance with the examples discussed above, the assisted-center for the pointer on its trajectory across gravity field 206 may be at the location marked with an "x," a "+," or between the "x" and the "+." Due to the close proximity of the "x" and the "+" for the pointer on its trajectory across gravitational field 206, deceleration within gravitational field 206 may cause the pointer to be placed at an assisted center between the "x" and the "+" or at the "+" upon decelerating within gravitational field 206.

As mentioned above, gravity-based link assist operates responsive to changes in velocity of a pointer. A pointer gravity application (discussed below) monitors changes in pointer velocity. When a pointer decelerates upon crossing a boundary of a gravitational field, or is within a threshold distance of a boundary of a gravitational field, the pointer gravity application moves the pointer from its current position to an assisted-center position relative to that gravitational field, as discussed above. In various implementations the pointer gravity application may exert a gravitational pull that keeps a pointer at an assisted-center position for a period of time. In such implementations, a user may overcome the gravitational pull by continuing to move the pointer or accelerate out of the gravitational pull.

Gravity-based link assist is implemented to enhance visual feedback in aiding the user as he or she moves the pointer over the links. Although multiple implementations are possible, assisted placement of the pointer is designed not to surprise the user by unnatural or startling placements. In the examples illustrated, when the links are traversed by a pointer traveling along one or both of the "A" and "B" trajectories, and the pointer decelerates within the gravity field of one of the links, the pointer may be repositioned at the assisted-center shown by the "x." This repositioning is manifest visually as the pointer being snapped or skipped to the horizontal and/or vertical center of the field consistent with the trajectory, thereby providing visual feedback to aid the user in seeing which link the pointer is currently referencing.

In another implementation, the pointer may be placed outside of the trajectory if the horizontal and vertical center of the visible link (shown by the "+") is within a threshold distance of the assisted-center. For example, in the illustrated trajectory 118A between points "A" and "B," when the pointer decelerates in the gravitational fields 208 or 124, the pointer may be placed at the center of the respective links. Similarly, in the illustrated trajectory 118B between points "C" and "D," when the pointer decelerates in the fields for the links corresponding to 206 or 210, the pointer may be placed at the center of the respective links.

In the examples illustrated by FIG. 2, for the trajectory 118B from point "C" to point "D," the pointer is depicted decelerating in the fields 204, 126 and 208 as shown by the underlines visible for those links. Various associated functionality may also be enabled in some instances. For example, assisted placement of the pointer on one link may provide an efficient route to an associated link. This is depicted in FIG. 2 where an associated link to gravity field 124 is presented for the author, Chris McDougal, as shown by the underline in gravity field 212. Thus, by activating an alternate selection input mechanism (e.g., pivot button 116 instead of the joystick 114), a user having navigated the pointer to the title of an item may access content about the author without having to navigate the pointer to the link for the author.

Figure 3:
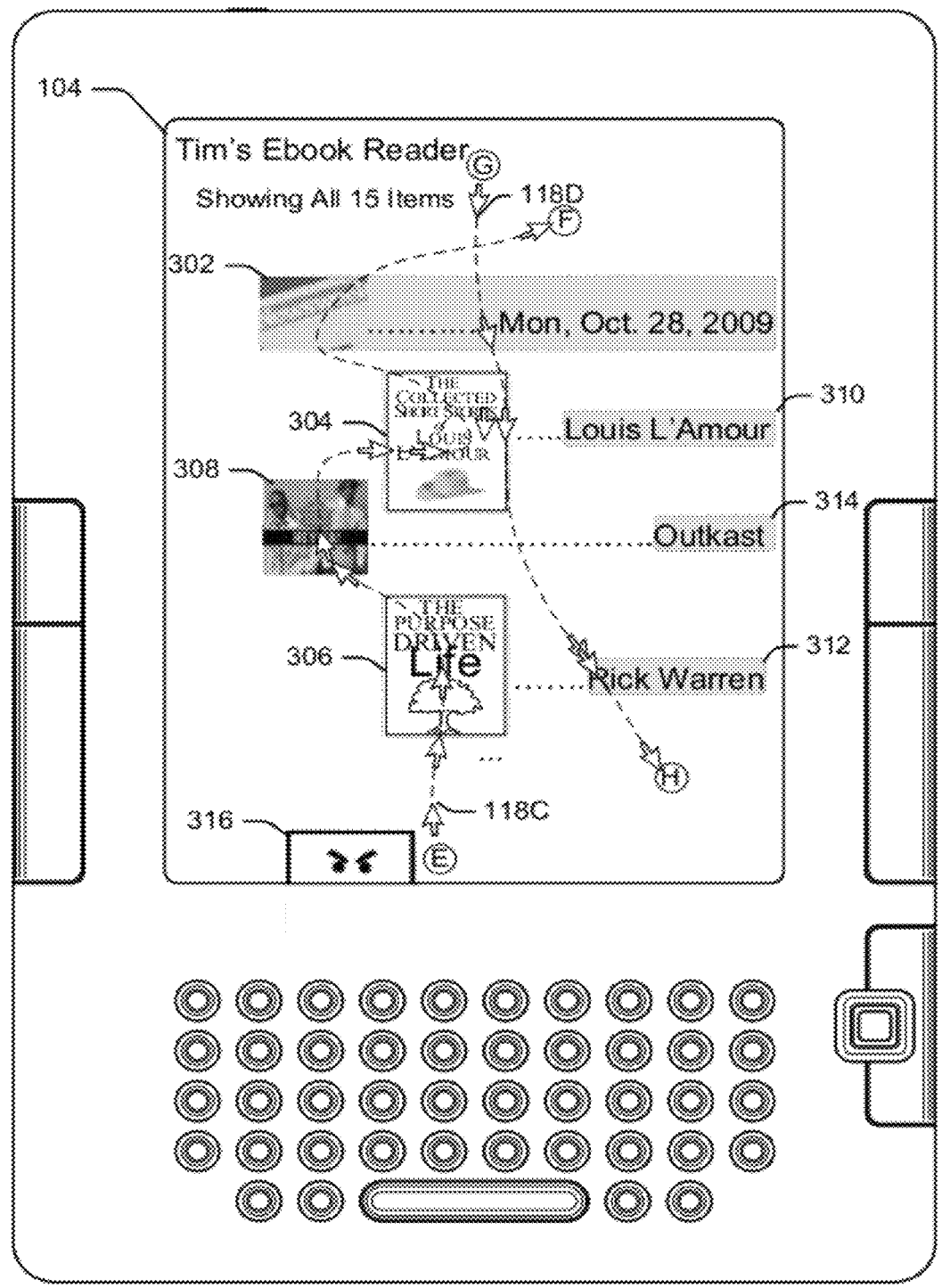
FIGS. 3 and 4 illustrate the eBook reader device of FIG. 1, but further show another illustrative screen rendering to demonstrate other aspects the gravity-based link assist techniques.

FIG. 3 illustrates another example of an implementation of gravity-based link assist in which several of the navigation elements presented as part of the UI are images.

FIG. 3 illustrates an eBook reader device 100(1) belonging to "Tim." Tim's eBook reader has multiple content items. On Tim's device we can see that not all of his 15 items are shown, and one is only partially scrolled onto the screen. His items include the eMagazine "Newsweek," shown with gravity field 302 several eBooks including "The Purpose Driven Life," shown with gravity field 304 and "The Collected Short Stories of Louis L'Amour," shown with gravity field 306, as well as an audio file, "Hey Ya!" shown with gravity field 308. Links and associated gravitational fields are also presented for the authors Louis L'Amour at 310 and Rick Warren at 312, as well as the group Outkast at 314. An audio file, "Parody of Have a Nice Day" shown with gravity field 316 is partially scrolled onto the screen. Note, in the illustrated example, the gravity field 302 associated with "Newsweek, Mon. Oct. 28, 2009" encompasses both the image and the date as a single field. Such a combined field may be desired when no link associated with the navigated link is available.

As illustrated, a pointer may follow a trajectory 118C from point "E" to point "F" generally toward the top of the display 104. Similarly, albeit not simultaneously, the pointer may follow a trajectory 118D from point "G" to point "H" generally toward the bottom of the display 104. In non-illustrated examples a pointer may follow a generally horizontal trajectory beginning at either the left or the right of the display.

As mentioned above, links represented by images may be configured to have a stronger gravitational pull than that of textual links. The serpentine nature of the trajectory beginning at point "E" close to the bottom of display 104 and moving up toward point "F" may be seen as an illustration of a stronger gravitational pull being assigned to images. However, in other implementations, the trajectory beginning at point "E" the may illustrate many users' innate desire to select images without employing a stronger gravitational pull for gravitational fields associated with image links. In both instances, the trajectory of the pointer is seen to move from one image to another. As demonstrated by the locations where the pointer is shown, the pointer decelerates within the gravity fields of "The Purpose Driven Life" at 306, "Hey Ya!" at 308, and "The Collected Short Stories of Louis L'Amour" at 304. However, in each instance the user has not stopped the pointer at the center of the link relative to the pointer's trajectory. Thus, the pointer is pulled to the assisted-center position as shown by the second instance of the pointer within gravitational fields 306, 308, and 304 respectively. This is discussed in more detail with regard to FIG. 4, below.

Similarly, as shown by the trajectory 118D of the pointer, beginning at point "G" and moving toward point "H," demonstrates an example of relative gravity. By virtue of the pointer 118D crossing the image and associated gravitational link 304 for "The Collected Short Stories of Louis L'Amour," the user is assumed to be interested in that link unless the user performs a horizontal motion to change the trajectory toward the "Louis L'Amour" link, 310. Thus, the pointer is pulled to the assisted-center position as shown by the second instance of the pointer, shifted slightly toward the center within gravitational field 304. Although not illustrated, a pointer trajectory could cross the image and associated gravitational link 316, for the "Parody of Have a Nice Day." In one such instance, the pointer is pulled to an assisted-center corresponding to the visible portion of the gravity field, without regard to the portion not present on the screen. In another instance, the presence of the pointer within the gravitational field may cause the image and associated gravitational link 316, for the "Parody of Have a Nice Day" to become fully visible on the screen.

Figure 4:
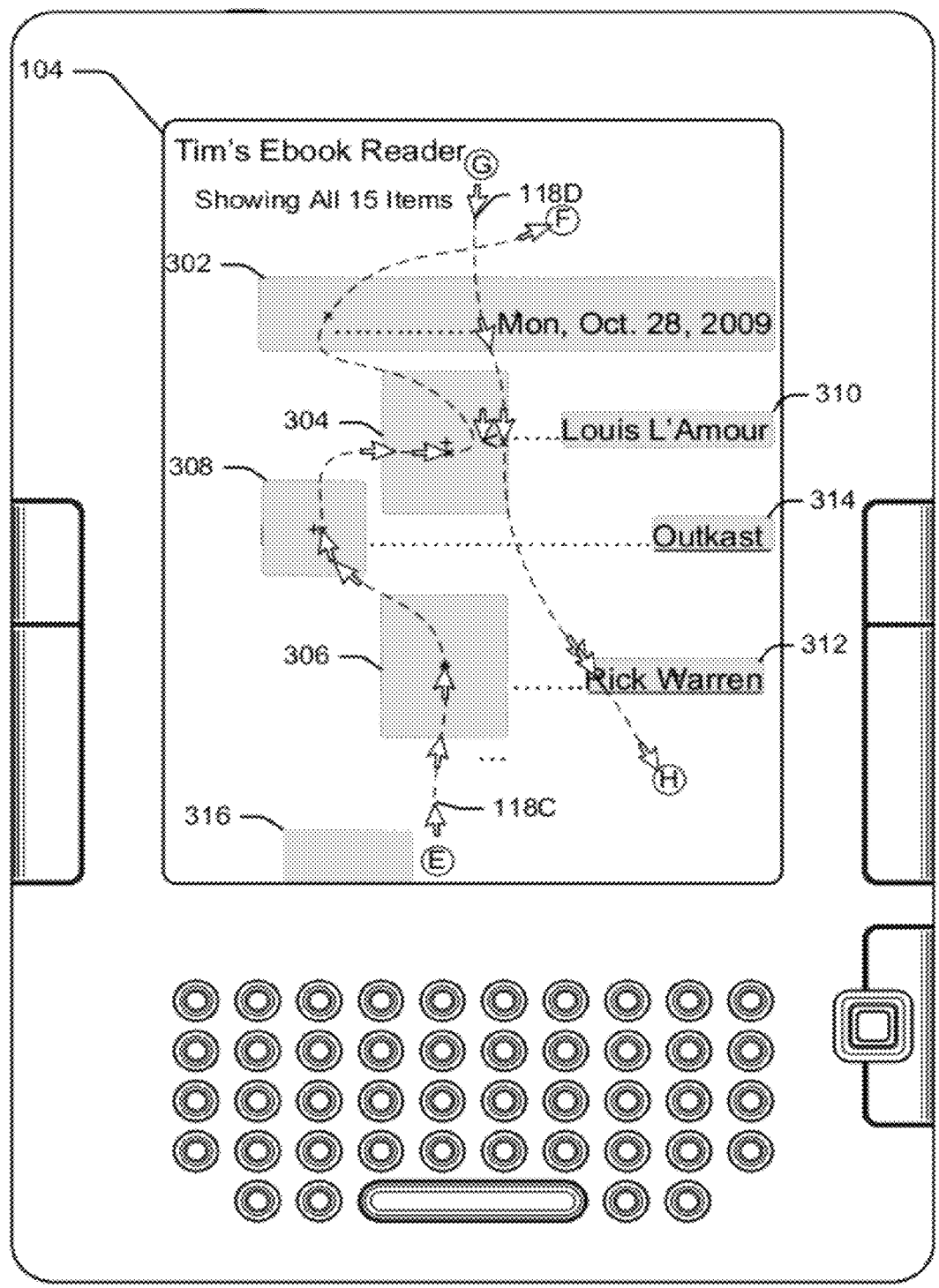

FIG. 4 shows essentially the same UI as that shown in FIG. 3, but it is altered to remove the images of the various links along the left-had side, leaving just the grayed area representing the gravitational fields. Centers of the gravitational fields are signified with a plus symbol "+" whereas the assisted-center positions along the trajectories 118C (from point "E" to point "F") and 118D (from point "G" to point "H") are demarcated with the letter "x," and assisted-center positions shifted from the trajectory toward the center "+" in are signified with a less-than symbol "<." Situations where the center of the visible portion of the link corresponds to the assisted-center position are illustrated with an asterisk "*" to denote alignment of the plus symbol "+" and the letter "x." Similar to the behavior discussed regarding FIGS. 1 and 2, the center "+" represents both the vertical and horizontal center of the gravitational field for the visible portion of the link. In contrast, the assisted-center position "x" represents the horizontal or vertical center of the gravitational field along the trajectory, while the assisted-center position "<" represents a position shifted from the trajectory toward the horizontal and vertical center "+" in situations when the assisted center along the trajectory is calculated as too close to an edge to be satisfying to a user.

In the examples illustrated, when the links are traversed by one or both of the trajectories 118C and 118D of the pointer, and the pointer decelerates within the gravity field of one of the links, the pointer may be placed at the assisted-center shown by the "x." In another implementation, the pointer may be placed at an assisted-center position outside of the trajectory if the horizontal and vertical center of the visible link (shown by the "+") is within a threshold distance of the assisted-center or if the assisted-center position along the trajectory is within a calculated distance from an edge of a gravitational field. For example, in the serpentine trajectory 118C from point "E" to point "F," when the pointer decelerates in the fields 308 or 304, the pointer may be placed at the horizontal and vertical center of the gravitational fields. However, in the trajectory 118D from point "G" to point "H," the pointer is not depicted as decelerating within the threshold distance of the horizontal and vertical center of the visible link (shown by the "+"). Thus, along the trajectory 118D from point "G" to point "H," the pointer is placed at an assisted-center of the respective links.

In the examples illustrated by FIG. 4, for the trajectory 118D, the pointer is depicted as coming within the gravitational field 304 and being placed at an assisted center (shown by the "<") closest to pointer's current trajectory which is a calculated distance toward the horizontal and vertical center of gravitational field 304. The pointer is later depicted as decelerating in the gravitational field 312 for the link corresponding to "Rick Warren" as shown by the pointer at the edge of the link and then positioned at the assisted center of the link as shown by the pointer within the gravitational field 312.

FIG. 3 and FIG. 4 also illustrate associated functionality such as that discussed above regarding FIG. 1 and FIG. 2. For example, assisted placement of the pointer on the image links may provide an efficient route to the associated links for the corresponding author or artist. This is depicted in FIG. 4 where an associated link to gravity field 308 is presented for the artists Outkast, as shown by the underline in gravity field 314, although neither pointer traverses field 314. Thus, by activating an alternate selection input mechanism (e.g., pivot button 116 instead of the joystick 114), a user having navigated the pointer to the image may access content about the author or artist without having to separately navigate the pointer to the link for the author or artist. Similarly, assisted placement on the link for the author or artist may provide an efficient route to the associated image link where an associated link from gravity field 312 for the author, Rick Warren, as shown by the underline in gravity field 312, is presented to the gravity field 306, which corresponds to an image of his work in Tim's collection of items. In at least one instance, activating an alternate selection input mechanism on partially visible gravity field 316 may cause the image and associated gravitational link 316 to become fully visible on the screen. In another instance, activating an alternate selection input mechanism on partially visible gravity field 316 may access content about the artist without having to obtain full visibility of gravity field 316 or a link to the artist.

Figure 5:
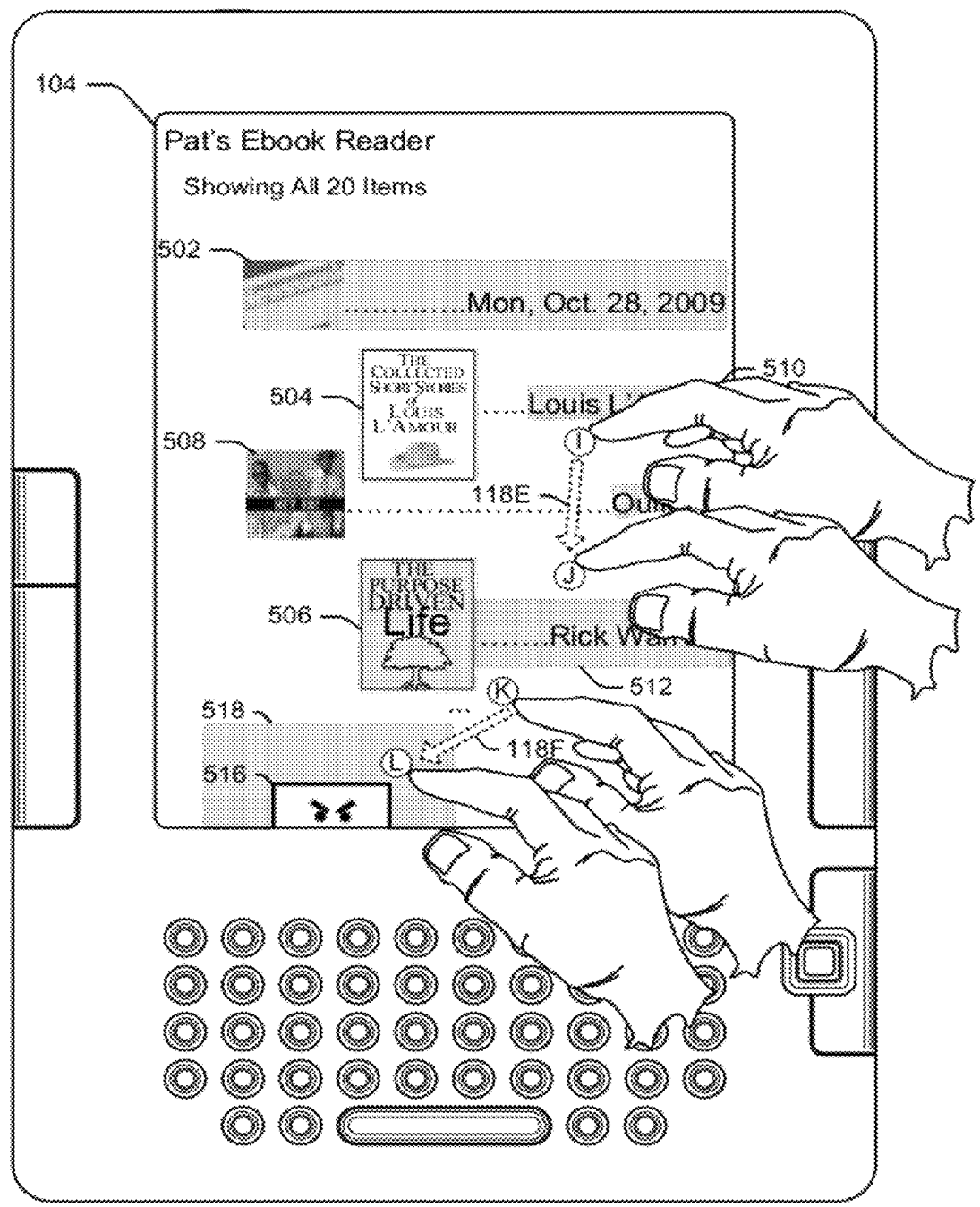
FIG. 5 illustrates the eBook reader device of FIG. 1, but further shows another illustrative screen rendering to demonstrate other aspects of link assist techniques.
Figure 6:
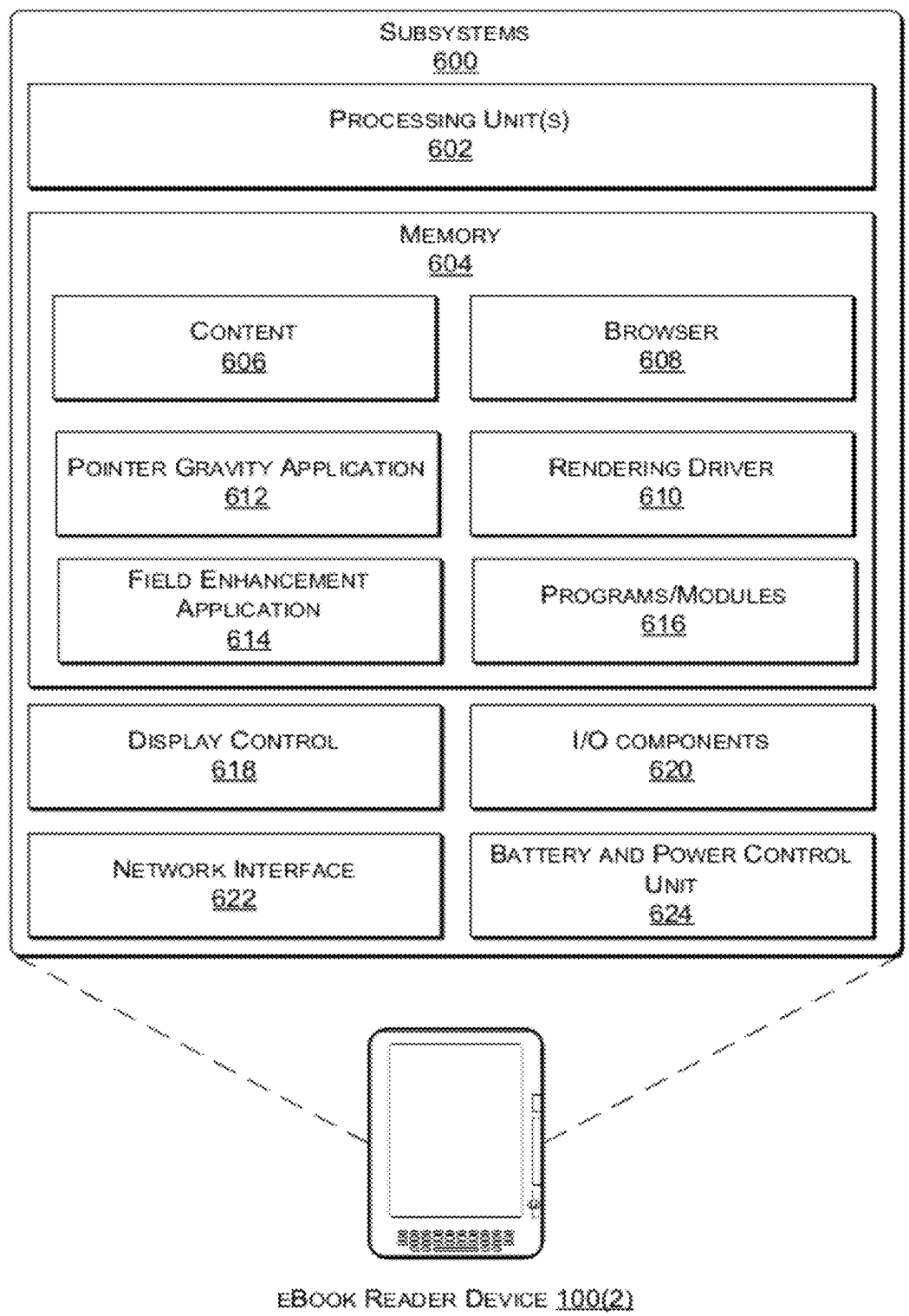
FIG. 6 is a block diagram of illustrative subsystems of an eBook reader device similar to that of FIG. 1.

FIG. 5 illustrates another example of an implementation of link assistance in which several of the navigation elements presented as part of the UI are images.

FIG. 5 illustrates an eBook reader device 100(1) belonging to "Pat." Pat's eBook reader has multiple content items, and the ones that are visible are the same as Tim's discussed above. On Pat's device we can see that not all of his 20 items are shown, and one is only partially scrolled onto the screen. His items include the eMagazine "Newsweek," shown with field 502, several eBooks including "The Purpose Driven Life," shown with field 504, and "The Collected Short Stories of Louis L'Amour," shown with field 506, as well as an audio file, "Hey Ya!" shown with field 508. Links and associated fields are also presented for the authors Louis L'Amour at 510, and Rick Warren at 512, as well as the group Outkast (not fully visible). An audio file, "Parody of Have a Nice Day" 516, shown with enhanced field 518 is partially scrolled onto the screen. Note, in the illustrated example, the field 502 associated with "Newsweek, Mon. Oct. 28, 2009" encompasses both the image and the date as a single field. Such a combined field may be desired when no link associated with the navigated link is available.

As illustrated, a touch input may follow a trajectory 118E from point "I" to point "J" generally toward the bottom of the display 104. Similarly, albeit not simultaneously, another touch input may follow a trajectory 118F from point "K" to point "L" generally diagonal from right to left of the display 104. In non-illustrated examples a pointer may follow a generally horizontal trajectory beginning at either the left or the right of the display.

As mentioned above, links may be configured to have a stronger gravitational pull or enhancement in some situations. In the instance of touch input, for example, navigation of a trajectory toward a navigation element such as the link for Rick Warren, may increase the size of the field 512. In the example illustrated, the size of the field 512 is approximately double the size of the field for Rick Warren represented in FIG. 3 due to the trajectory of the touch input toward that particular field. Thus, while on the trajectory 118E and when the touch input slows, as shown at point "J," the field 512 is increased based on the trajectory. In at least one implementation, the size of the field is increased responsive to the touch input slowing or stopping. Thereafter, when a tap input is received within the enlarged field (or within a threshold distance of the enlarged field), a selection indication is provided graphically and/or audibly. In each instance, the enhanced field improves user satisfaction with link selection while using touch input.

Additional, functionality is also enabled via enhanced fields for touch input. In the illustrated example, the enlarged field 512 is shown merged with that for 506. This enables a user to provide an alternate touch input to access the associated link for the book, "The Purpose Driven Life." For example, provided that point "J" is within the configured threshold distance to the filed 512, a double tap, swipe, or other alternate touch input at "J" may activate the book link via field 506.

Similarly, as shown by the trajectory 118F, beginning at point "K" and moving toward point "L," demonstrates an example enhanced field for a link that is only partially visible. By virtue of the touch input 118F having a trajectory that will cross the image 516, for the "Parody of Have a Nice Day," the user is assumed to be interested in that link. As shown, the associated field 518 has been enlarged to improve the user's experience. In the instance shown, a tap at point L will activate the link 516. In another instance, the touch input (e.g., tap), or an alternate touch input (e.g., double tap), within the field or within a threshold distance of the field may cause the image 516 and associated enhanced field 518, for the "Parody of Have a Nice Day" to become fully visible on the screen.

In various embodiments, although an enhanced field is provided that provides improved functionality for touch input by expanding sensitivity of the link, no graphical indication of the enhancement is provided.

Illustrative Electronic Device Subsystems

In addition to the exterior components enumerated in FIG. 1, an electronic device 100 also has various internal components, which are referred to generally as subsystems 600. The subsystems 600 include at least one processing unit 602 and memory 604. The processing unit 602 interacts with the memory 604 to facilitate operation of the electronic device, such as eBook reader devices 100(1) or 100(2). The memory 604 may be used to store content 606, such as eBooks, periodicals, audio and/or video media, etc. The memory 604 may also include a browser 608, a rendering driver 610, and a pointer gravity application 612 to implement gravity-based link assist.

In some implementations the memory 604 also includes field enhancement application 614 and/or other software programs or other executable modules 616 that may be executed by the processing unit 602. Examples of such programs or modules include indexing modules for indexing content, reader programs, content presentation applications, control modules (e.g., power management), network connection software, an operating system, interface drivers, sensor algorithms, page turn detectors, user credentials and such.

Subsystems 600 may include various other internal components including, for example, a display control 618, input/output (I/O) components 518, a wireless interface device 622, and a battery and power control unit 624.

In at least one implementation, display control 618 enables setting various parameters for display 104. In one implementation, the display 104 uses electronic paper (e.g., ePaper™) display technology, which is bi-stable, meaning that it is capable of holding text or other rendered images even when very little or no power is supplied to the display. Some example electronic-paper-like displays that may be used with the implementations described herein include bi-stable LCDs, MEMS, cholesteric, pigmented electrophoretic, and others. In other implementations, or for other types of electronic devices, the display 104 may be embodied using other technologies, such as LCDs and OLEDs, and display control 618 further may include a touch screen controller.

Input/output (I/O) components 620 may include various user interface controls (e.g., controls for buttons 110 and 116, joystick 114, keyboard 106, etc.), audio speakers, connection ports, and so forth. In some implementations, a touch sensitive mechanism may be included in the I/O components to interact with the display 104 to form a touch-screen display.

A network interface 622 supports both wired and wireless connection to various networks, such as cellular networks, radio, WiFi networks, short range networks (e.g., Bluetooth), IR, and so forth.

The electronic device 100 may also include a battery and power control unit 624. The power control unit operatively controls an amount of power, or electrical energy, consumed by the electronic device. Actively controlling the amount of power consumed by the device may achieve more efficient use of electrical energy stored by the battery.

The memory 604 may include volatile memory (such as RAM), nonvolatile memory, removable memory, and/or non-removable memory, implemented in any method or technology for storage of information, such as computer-readable instructions, data structures, program modules, or other data. Also, the processing unit 602 may include onboard memory in addition to or instead of the memory 604. Some examples of storage media that may be included in the memory 604 and/or processing unit 602 include, but are not limited to, random access memory (RAM), read only memory (ROM), electrically erasable programmable read only memory (EE-PROM), flash memory or other memory technology, compact disk (CD-ROM), digital versatile disks (DVD) or other optical storage, magnetic cassettes, magnetic tape, magnetic disk storage or other magnetic storage devices, or any other medium which can be used to store the desired information and which can be accessed by the electronic device 100. Any such computer-readable media may be part of the electronic device 100.

The electronic device 100 may have additional features or functionality. For example, an eBook reader device such as device 100(1) or device 100(2) may also include additional data storage devices (removable and/or non-removable) such as, for example, magnetic disks, optical disks, or tape. The additional data storage media may include volatile and non-volatile, removable and non-removable media implemented in any method or technology for storage of information, such as computer readable instructions, data structures, program modules, or other data.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processing unit 602, as hardware, and/or as firmware. Typically, the functionality of the program modules may be combined or distributed as desired in various embodiments. An implementation of these modules and techniques may be stored on some form of computer-readable media. Another implementation of these modules and techniques may be transmitted across some form of communication media.

Architectural Environment

Figure 7:
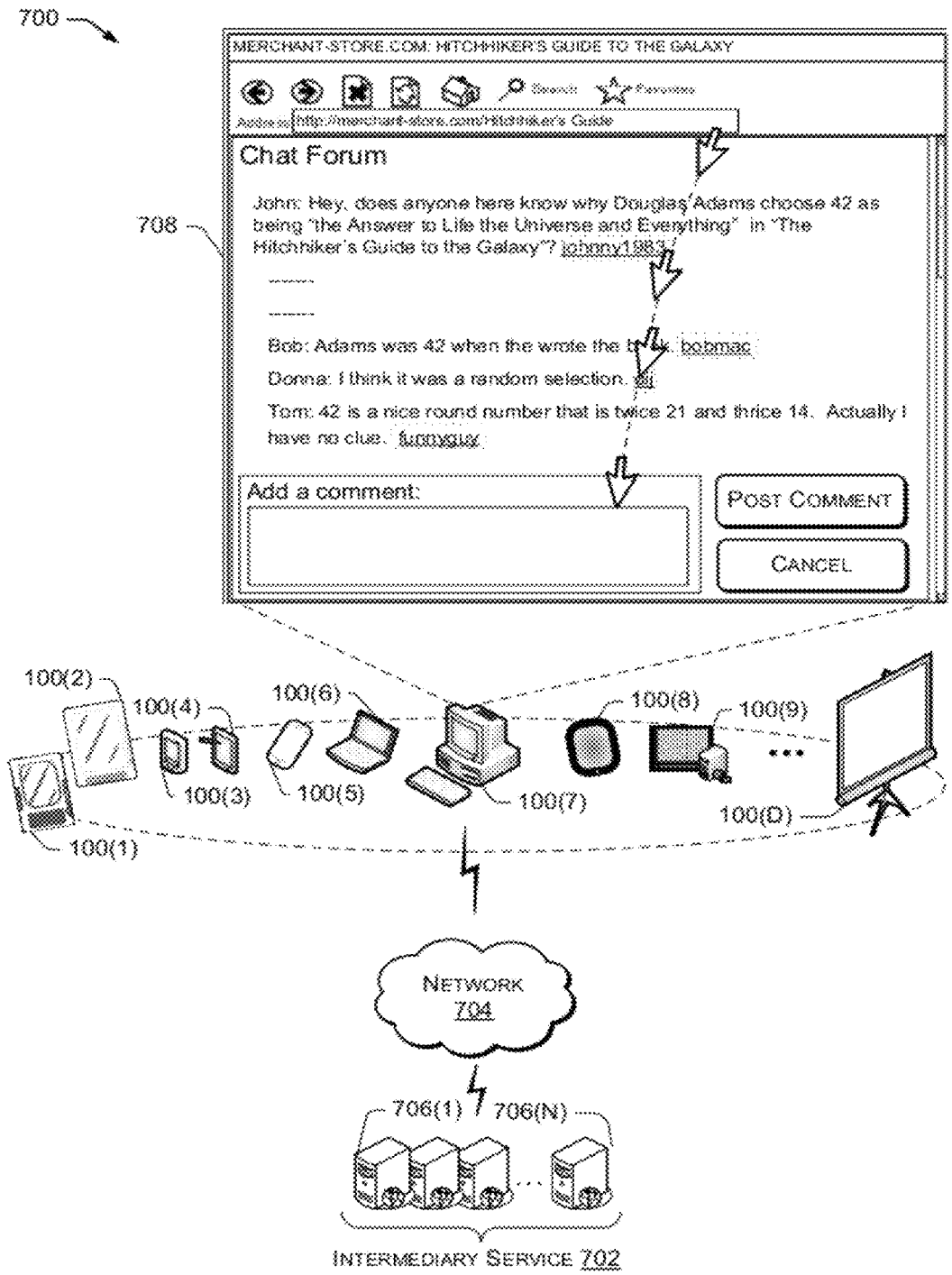
FIG. 7 illustrates an architecture in which gravity-based link assist techniques may be employed by a variety of devices to enhance user experience in navigating links on the devices.

FIG. 7 illustrates an example architecture 700 in which a variety of electronic devices 100 may employ gravity-based link assist to enhance user experience. The electronic devices 100 are variously configured with different functionality to enable consumption of one or more types of media items. The media items may be any type or format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content.

Essentially any type of content rendering device may be used to consume media items, and thereby benefit from an enhanced user experience. In this example, such devices include a first eBook reader device 100(1), a second eBook reader device 100(2), a portable digital assistant (PDA) 100 (3), a smart phone 100(4), a multifunction communication device 100(5) such as the iPhone® device from Apple, Inc., a laptop computer 100(6), a desktop computer 100(7), a tablet computer 100(8) such as the iPad® device from Apple, Inc., an entertainment system 100(9), and a projection screen 100 (D). While these example devices are shown for purposes of illustration and discussion, it is noted that many other electronic devices may be used, such as portable media players, cameras, video cameras, netbooks, notebooks, gaming consoles, DVD players, media centers, and such.

The electronic device 100 may communicate with an intermediary service 702 via a network 704. Electronic devices 100 may connect to network 704 using wired or wireless links, such as WiFi, Bluetooth, infrared (IR), radio, and so on. Additionally, multiple electronic devices 100 may connect to each other via ad hoc wireless networks. In such networks, which are also referred to as "mesh" networks, protocols exist to enable wireless devices to discover and connect to one another. One example of a wireless technology and associated protocols is the WiFi wireless networking technologies defined according to IEEE 802.11 standards. Bluetooth is another example of an open wireless protocol for exchanging data over short distances between devices.

In some implementations, an ad hoc network may be established between two or more devices, such as the eBook reader device 100(1) and eBook reader device 100(2). These devices may be operated in a master/slave arrangement, or in a peer-to-peer arrangement. In other implementations, the ad hoc network may be embodied as a mesh network where some devices act as intermediary devices between the endpoint devices. In such cases, the intermediary devices may be configured as both master/slave to receive communication from one device (such as the eBook reader device 100(2)) and pass that communication onto the next device (such as another electronic device 100(1-D)).

Alternatively, the electronic device 100 may indirectly connect to another of the electronic devices 100 by sending instructions through an intermediary party, such as a service 702 hosted on a server system composed of multiple servers 706(1), . . . , 706(N). The electronic devices 100 communicate with the service 702 over a network 704. The network 704 is representative of any one or combination of multiple different types of networks, such as the Internet, cable networks, cellular networks, wireless networks, and wired networks.

The servers 706(1)-(N) collectively have processing and storage capabilities to receive requests from the electronic devices 100 for enhanced media experience. In one implementation, the servers 706(1)-(N) facilitate continuing communication between two or more devices as an alternative to, or in addition to, use of the ad hoc network. In some implementations, the servers 706(1)-(N) store the digital media items, although in other implementations, the servers merely facilitate communications between devices. The servers 706 (1)-(N) may be embodied in any number of ways, including as a single server, a cluster of servers, a server farm or data center, and so forth, although other server architectures (e.g., mainframe) may also be used.

The devices depicted in architecture 700 provide an enhanced user experience by providing gravity-based link assist as discussed, above. For instance, suppose a particular device, for example 100(7) includes a sensitive input mechanism with which a particular user has had minimal experience. Gravity-based link assist employing pointer gravity enhances the experience of the user by alleviating frustration with the new input mechanism. Similarly, some users may lack the fine motor skills desired to operate a variety of input mechanisms due to declining health, injury, etc. Gravity-based link assist facilitates such users' enjoyment of a wide array of electronic devices 100.

As illustrated in the example screen shot at 708, different types of links may be set with different gravity. As shown from the address bar the pointer travels vertically down the screen, over the link for the commenter "dij" and stops at the comment box. In this instance the user may have set the comment box type to have a maximum relative gravity or the commenter "dij" to have no gravity or minimal relative gravity.

In increasing numbers, additional functionality is being ascribed to existing devices. In some instances the available input mechanisms do not provide a satisfactory user experience when accessing the added functionality. For example, some television remote controls are not currently well suited to internet browsing via entertainment systems such as 100 (9). Users of such systems are generally limited to hopping from one link to another through an electronic program guide. Gravity-based link assist enables more enjoyable user interaction by predicting the user's desired target link based on trajectory and pointer deceleration within a gravity field and automatically placing the pointer at the assisted-center of the target link. Similarly, many speakers are challenged to keep a pointer from wobbling wildly when giving a presentation using a projection screen such as 100(D) with a laser pointer. Such users benefit from having a presentation with embedded links and using an input mechanism (e.g., smart pointer) employing gravity-based link assist.

Example Operation

Figure 8:
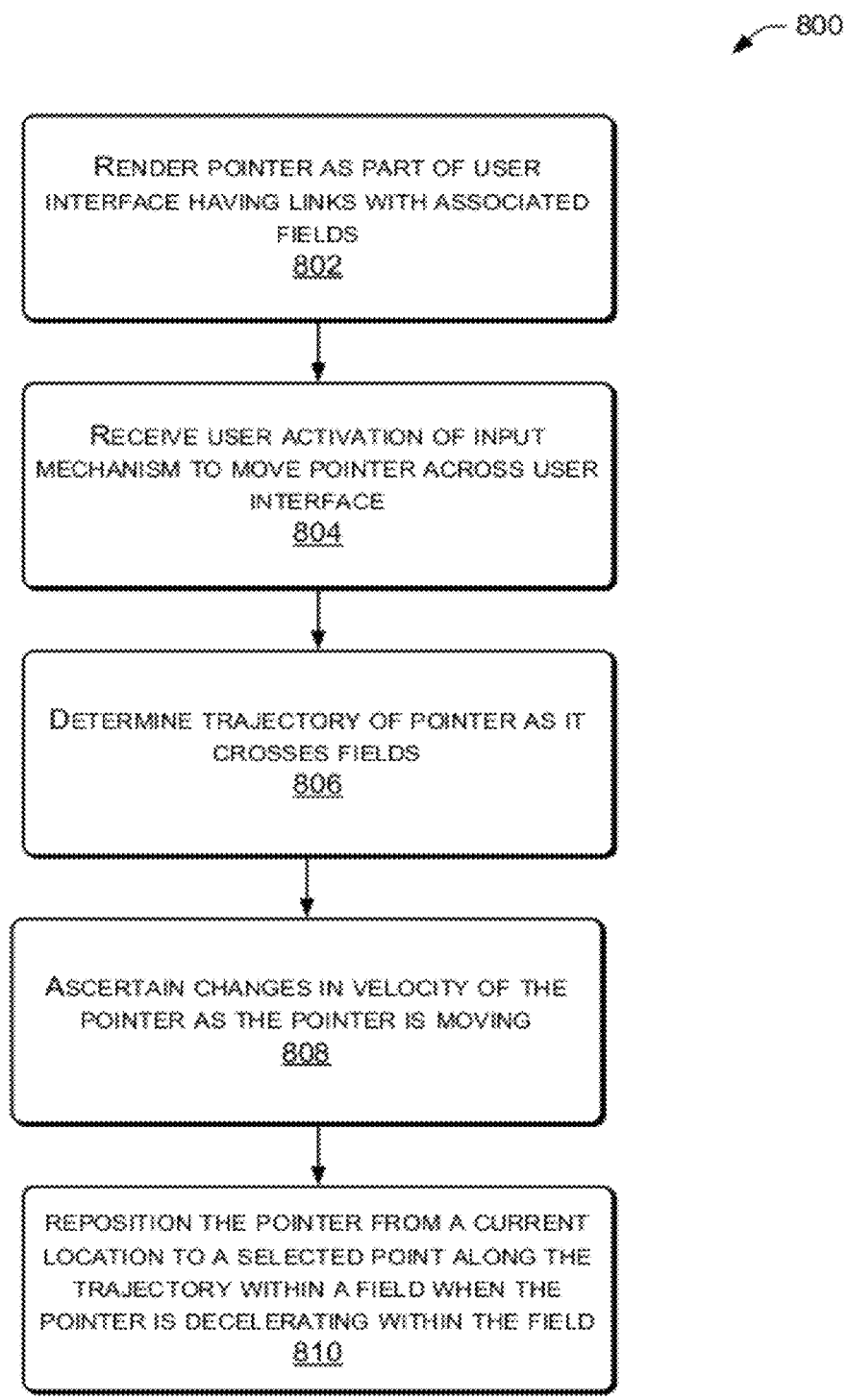
FIGS. 8-11 are flow diagrams for processes of implementing link assistance and presenting the assistance in a way that facilitates enhanced user experience.

FIG. 8 is a flowchart of an illustrative method 800 that may be implemented using the electronic device of FIGS. 1-5. The method 800 may alternatively be implemented using a different electronic device such as one or more of those shown in FIG. 7.

The method 800 begins, at 802, when a cursor or a pointer is rendered as part of a user interface of an electronic device, such as the eBook reader 100(1). In several implementations the user interface is an interface to a browser. The user interface has at least one navigation element such as an actuatable link (e.g., a hyperlink). The navigation element has an associated field, such as a gravity field 120 representing an area that surrounds the navigation element.

At 804, a user activates a user input mechanism, such as joystick 114, to move the pointer across the user interface.

At 806, the processing unit 602 in concert with the browser 608 (or another program in memory 604) determines the trajectory of the pointer as it crosses the field associated with the link.

At 808, the processing unit 602 employs pointer gravity application 612 and data from the rendering driver 610 to ascertain changes in velocity of the pointer as the pointer is moving. Velocity represents the rate of change of pointer position along a path or trajectory as shown in the following equation.

$$\bar{v} = \frac{\Delta d}{\Delta t}$$

Velocity represents a change in displacement over time. Thus, velocity includes a directional component, e.g., the direction of displacement. The direction of displacement may be determined based on two or more input points obtained from the pointer movement. In some embodiments input may be sampled at predetermined intervals of time to determine directionality. In other embodiments the input is sampled when the pointer enters a gravitational field.

At 810, when the pointer is located within a gravity field and decelerating, the processing unit 602 in concert with the rendering driver 610 repositions a rendering of the pointer from its current point to an assisted-center point relative to the trajectory, the visible portion of the link and the gravity field. In some embodiments the repositioning occurs responsive to the speed of the pointer reaching zero. However, in several embodiments an activation speed may be configured such that when the pointer decelerates so that the speed of the pointer coincides with the activation speed, pointer gravity is activated to reposition the pointer at the assisted-center along the trajectory of the pointer at the time the activation speed was reached.

Figure 9:
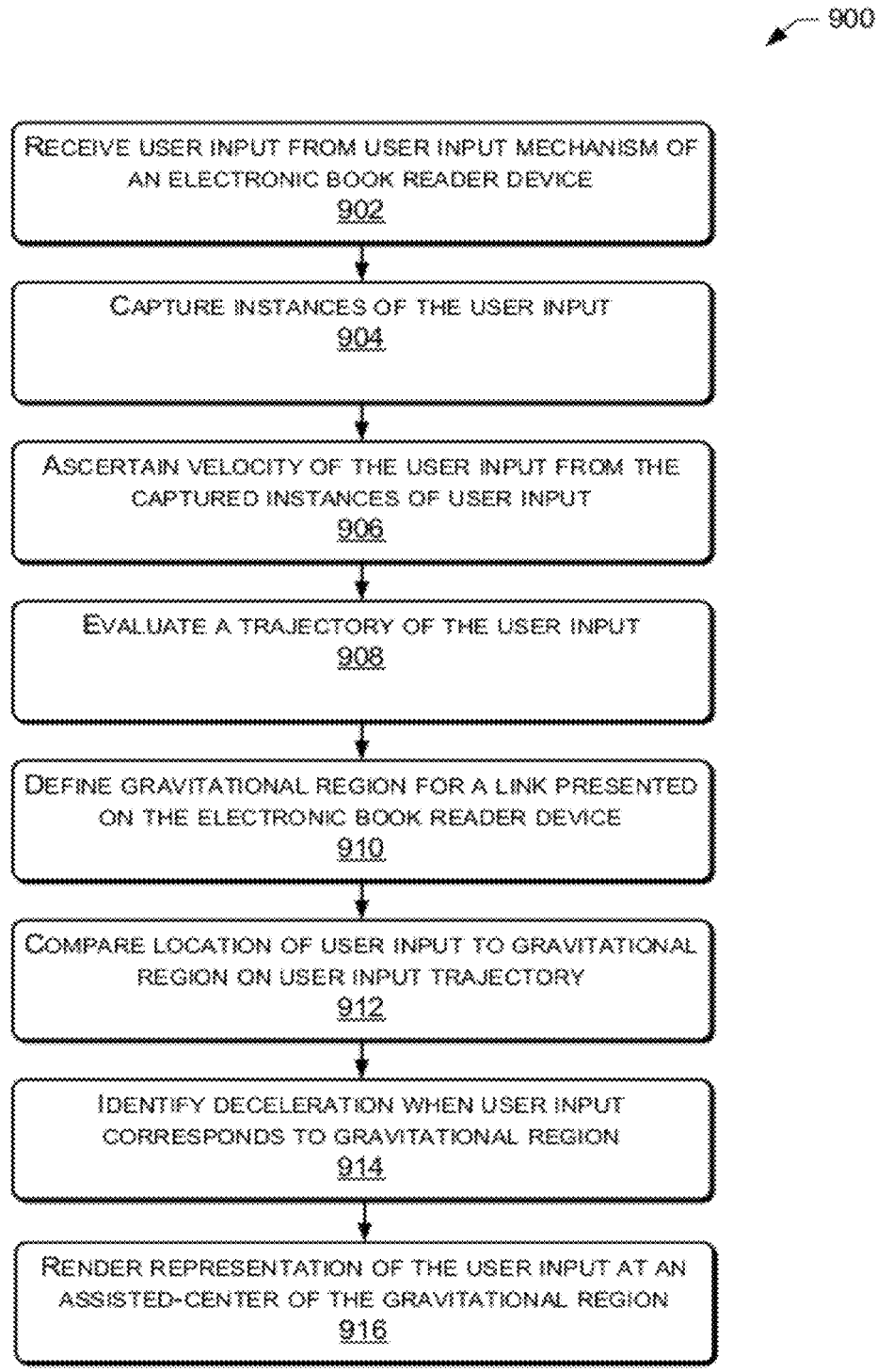

FIG. 9 is a flowchart of another illustrative method 900 that may be implemented using the electronic device of FIGS. 1-5. The method 900 may alternatively be implemented using a different electronic device such as one or more of those shown in FIG. 7.

The method 900 begins, at 902, when user input is received via a user input mechanism (e.g., a joystick, a touch screen, etc.) of an electronic device, such as the eBook reader 100(1). In several implementations the user input is received while browsing a user interface on the electronic device. In various embodiments, the user input signifies a point of control and is represented by a pointer or cursor in the user interface of the electronic device.

At 904, instances of the user input are captured for use by a gravity-based link assistance application, such as pointer gravity application 612. In a variety of implementations, the instances of the user input that are captured are determined based on one or more of pixel granulation of a display screen of the electronic device or a refresh rate of a display screen of the electronic device.

At 906, the processing unit 602 and gravity-based link assistance application ascertain velocity of the user input from the captured instances of user input.

At 908, the processing unit 602 in concert with the gravity-based link assistance application evaluates a trajectory of the user input based on the captured instances of user input.

At 910, the processing unit 602 in concert with the gravity-based link assistance application defines a gravitational region corresponding to a navigational element, such as a link, presented on the user interface of the electronic device. The actuatable link may have an associated gravitational region, such as a gravity field 120. In several implementations, the gravitational region represents an area of the actuatable link and/or the area of the actuatable link and a predetermined and/or configurable amount of surrounding space. In at least one example, the surrounding space is measured relative to the portion of a link that is visible on the display when the entire link is not visible. In at least one instance, a gravitational region corresponding to a link may already be defined and act 910 may be omitted.

At 912, a location of the user input received from the user input mechanism is compared to a gravitational region of the user interface along the trajectory of the user input.

At 914, the processing unit 602 in concert with the gravity-based link assistance application identifies deceleration of the user input when the user input is in an area corresponding to a gravitational region.

At 916, a representation of the user input is rendered at a selected point of the gravitational region in the user interface of the display 104. The representation is rendered by the processing unit 602 in concert with the gravity-based link assistance application and the rendering driver 610, responsive to the user input coming to a stop within the gravitational region or within a threshold distance of the gravitational region. In some instances, the selected point represents an assisted-center point relative to the trajectory, a visible portion of the link and/or the gravity field. Such an assisted-center point may be a calculated middle based on the horizontal and vertical middle of the gravitational region, and in some cases may be selected based on the portion of the link visible on the display without regard to extended portions of the link that are not visible on the display. The representation rendered in various examples may include a modified representation of the user input such as a different graphic, an enlarged graphic, and/or a non-visual representation such as feedback associated with the user input.

In some embodiments the rendering occurs responsive to the speed of the representation of the user input reaching zero. However, in several embodiments an activation speed may be configured such that when the speed of the representation of the user input coincides with the activation speed, pointer gravity is activated to render the representation of the user input at the assisted-center along the trajectory of the representation of the user input at the time the activation speed was reached.

Figure 10:
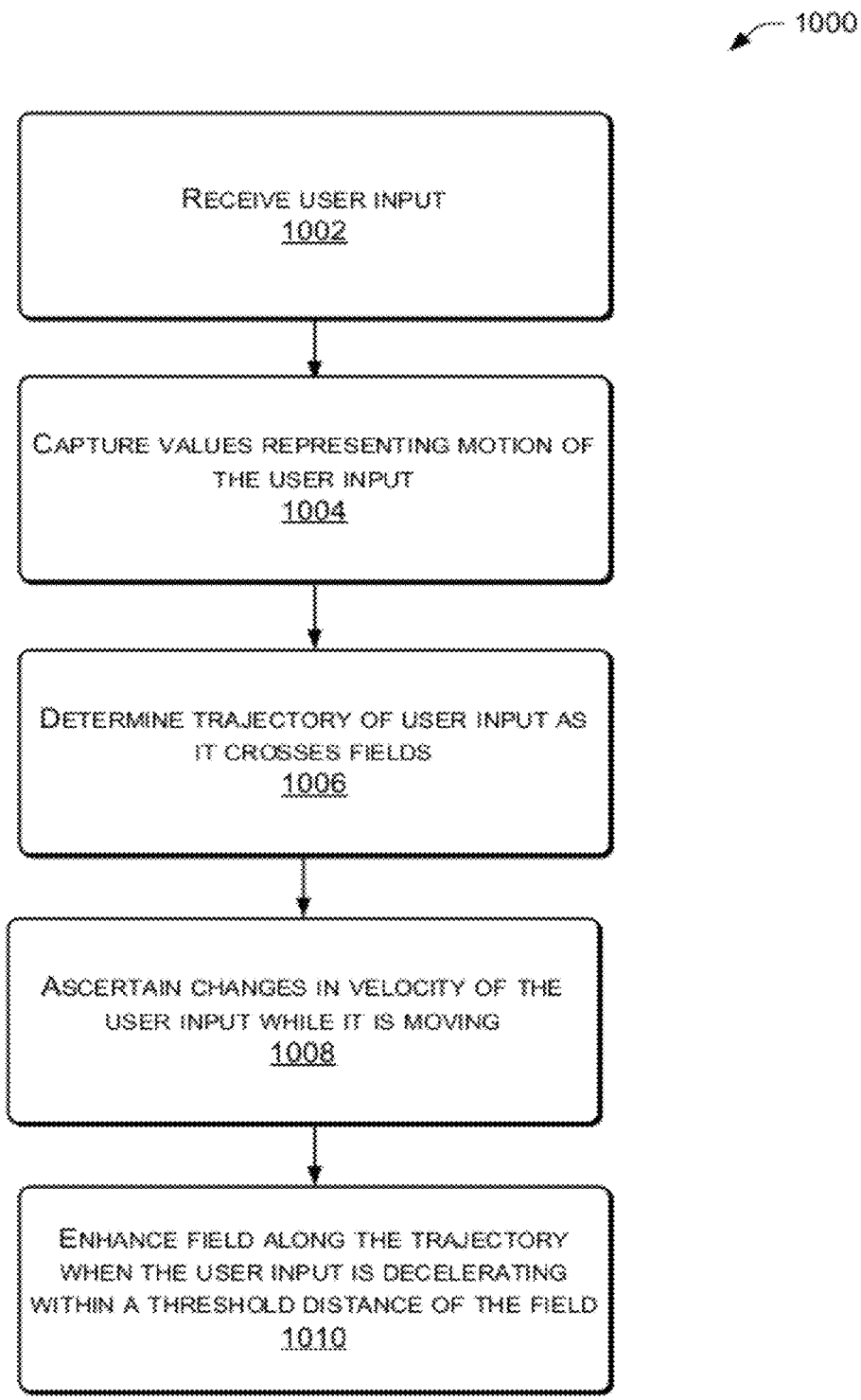

FIG. 10 is a flowchart of an illustrative method 1000 that may be implemented using the electronic device of FIGS. 1-5. The method 1000 may alternatively be implemented using a different electronic device such as one or more of those shown in FIG. 7.

The method 1000 begins, at 1002, when a user input is received via a user interface of an electronic device, such as the eBook reader 100(1). In several implementations the user input is touch input, and the interface is an interface to a browser, although the techniques apply to any other user interfaces. The user interface has at least one navigation element such as an actuatable link (e.g., a hyperlink). The navigation element has an associated field, such as a gravity field 120 representing an area that surrounds the navigation element.

At 1004, values representing motion of the user input are captured via the user interface, e.g., via a touch interface.

At 1006, the processing unit 602 in concert with the browser 608 (or another program in memory 604) determines the trajectory of the user input as it crosses the field associated with the link.

At 1008, the processing unit 602 employs field enhancement application 614 and data from the rendering driver 610 to ascertain changes in velocity of the user input as the user input (e.g., a user's finger) is moving. Velocity represents the rate of change of input position along a path or trajectory as shown in the following equation.

$$\bar{v} = \frac{\Delta d}{\Delta t}$$

Velocity represents a change in displacement over time. Thus, velocity includes a directional component, e.g., the direction of displacement. The direction of displacement may be determined based on two or more input points obtained from the user input movement. In some embodiments input may be sampled at predetermined intervals of time to determine directionality. In other embodiments the input is sampled when the input (e.g., finger) enters a gravitational or other enhanced field.

At 1010, when the user input is located within a field or within a threshold distance of a field such as a gravity field or other enhanced field and decelerating, the processing unit 602 and field enhancement application 614, sometimes in concert with the rendering driver 610, enhances the field by, for example, enlarging the field or merging two or more fields. In some embodiments the enhancement occurs responsive to the speed of the user input reaching zero. However, in several embodiments an activation speed may be configured such that when the user input decelerates so that the speed of the user input coincides with the activation speed, pointer gravity is triggered to activate the next gravity field along the trajectory of the user input at the time the activation speed was reached.

Figure 11:
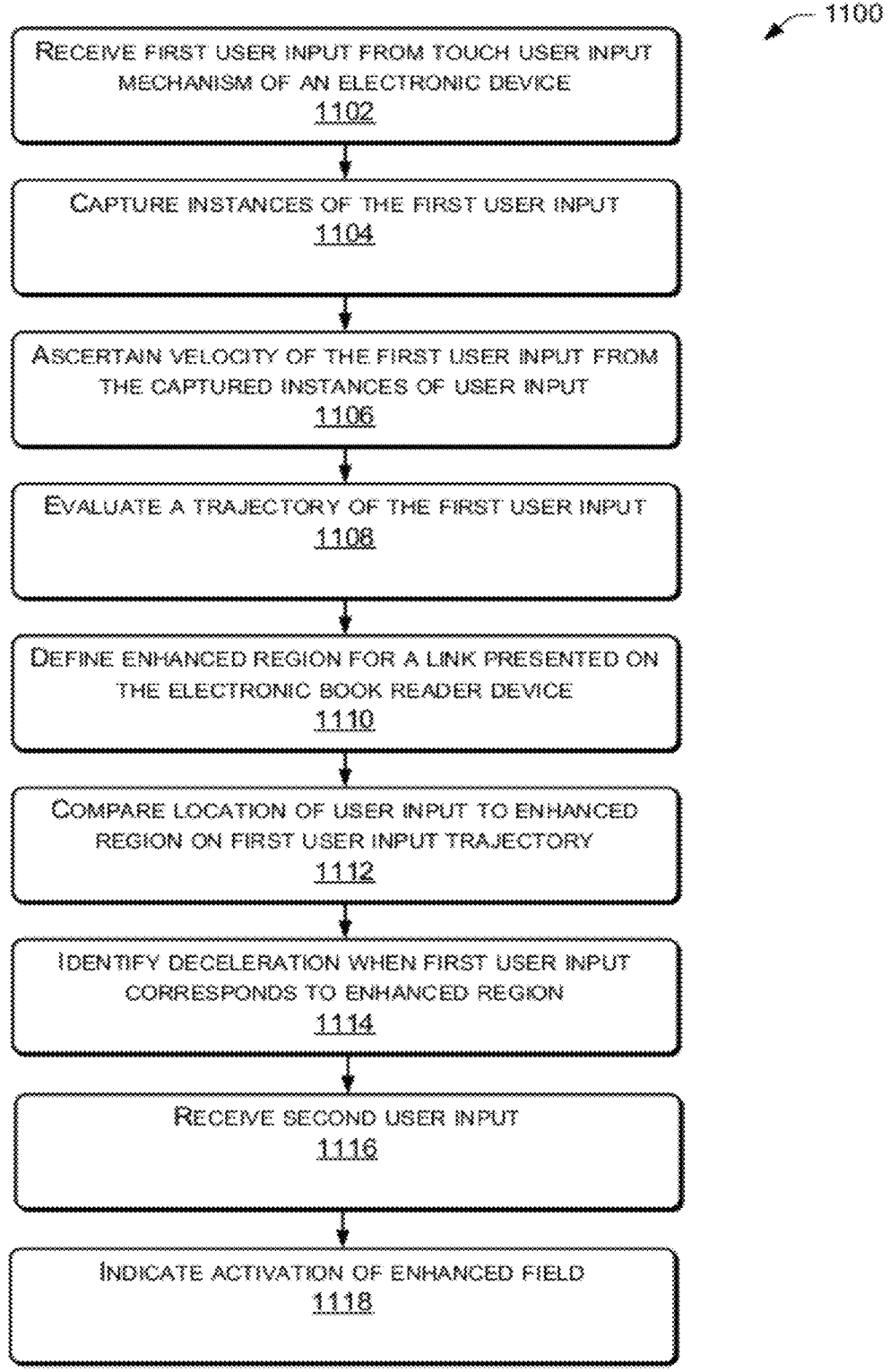

FIG. 11 is a flowchart of another illustrative method 1100 that may be implemented using the electronic device of FIGS. 1-5. The method 1100 may alternatively be implemented using a different electronic device such as one or more of those shown in FIG. 7.

The method 1100 begins, at 1102, when a first type of user input is received via a touch user input mechanism of an electronic device, (e.g., eBook reader 100(1), eBook reader 100(2), any of the other electronic devices shown in FIG. 7, etc.). In several implementations the user input is received while browsing a user interface on the electronic device. In various embodiments, the user input signifies a point of control and is received via touch (e.g., finger, stylus, etc.) control of the user interface of the electronic device.

At 1104, instances of the first type of user input are captured for use by an input assistance application, such as field enhancement application 614 and/or pointer gravity application 612. In a variety of implementations, the instances of the first type of user input that are captured are determined based on one or more of pixel granulation of a display screen of the electronic device or a refresh rate of a display screen of the electronic device.

At 1106, the processing unit 602 and input assistance application ascertain velocity of the first type of user input from the captured instances of the first type of user input.

At 1108, the processing unit 602 in concert with the input assistance application evaluates a trajectory of the first type of user input based on the captured instances of first type of user input.

At 1110, the processing unit 602 in concert with the input assistance application defines an enhanced region corresponding to a navigational element, such as a link, presented on the user interface of the electronic device. The actuatable link may have an associated enhanced region, such as a gravity field 120, or enhanced fields 512 or 518. In several implementations, the enhanced region represents an area of the actuatable link and/or the area of the actuatable link and a predetermined and/or configurable amount of surrounding space. In at least one example, the surrounding space is measured relative to the portion of a link that is visible on the display when the entire link is not visible. In at least one instance, an enhanced region corresponding to a link may already be defined and act 1110 may be omitted.

At 1112, a location of the first type of user input received from the user input mechanism is compared to an enhanced region of the user interface along the trajectory of the first type of user input.

At 1114, the processing unit 602 in concert with the input assistance application identifies deceleration or ceasing of the first type of user input when the first type of user input is in an area corresponding to an enhanced region. For example, within a calculated threshold distance of an enhanced region.

At 1116, a second type of user input (e.g., tap, double tap, etc.) is received via the touch user input mechanism of the electronic device. In some instances the second type of user input is recognized as being within a calculated proximity of the last instance of the first type of user input.

At 1118, responsive to receiving the second type of user input, an indication of activation of the enhanced field is provided. The indication may be an audio, graphical and/or tactile indication. In some instances the indication includes activation of the associated link. In various implementations, the representation is rendered by the processing unit 602 in concert with the input assistance application and the rendering driver 610, responsive to the second type of user input within the enhanced region or within a threshold distance of the enhanced region. The representation rendered in various examples may include a modified representation of the enhanced field or of the associated link such as a different graphic, an enlarged graphic, and/or a non-visual representation such as audio or tactile feedback associated with the user input.

Certain acts in methods 800, 900, 1000 or 1100 need not be performed in the order described, may be modified and/or may be omitted entirely, depending on the circumstances. Moreover, any of the acts of any of the methods described herein may be implemented by a processor or other computing device based on instructions stored on one or more computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method implemented on an electronic book reader device, the method comprising:
   presenting a user interface (UI) with one or more navigational elements on a display of the electronic book reader device, the UI having a movable pointer to allow user selection of the navigational elements;
   defining a gravitational region corresponding to individual navigational elements, the gravitational region providing a visual effect to attract the pointer to the gravitational region as the pointer is moved across the corresponding navigational element;
   receiving user-controlled movement of the pointer within the UI;
   monitoring a trajectory of the pointer as the pointer is moved over the navigational elements;
   determining whether the pointer is decelerating within a particular gravitational region, wherein determining whether the pointer is decelerating within the particular gravitational region comprises determining whether the pointer is decelerating within a predetermined distance relative to the gravitational region; and
   responsive to determining the deceleration, repositioning the pointer to another location within the gravitational region.

2. A method as recited in claim 1, wherein the another location is approximately center of the navigational element.

3. A method as recited in claim 1, wherein the one or more navigational elements comprise hyperlinks.

4. A method as recited in claim 1, wherein the gravitational region is identified as the space covered by the navigational element.

5. A method as recited in claim 1, wherein the gravitational region is identified as the space covered by the navigational element and a predetermined amount of surrounding space.

6. A method as recited in claim 5, wherein the surrounding space is measured relative to the center of the navigational element that is presented on the display.

7. A method as recited in claim 1, wherein the predetermined distance includes a configurable distance relative to the gravitational region.

8. A method as recited in claim 1, wherein the another location comprises a calculated middle of the gravitational region and the another location is based at least in part on the part of the navigation element visible on the display, irrespective of parts of the navigation element that may extend beyond the display.

9. A method implemented on an electronic book reader device, the method comprising:
   presenting a user interface (UI) with one or more navigational elements on a display of the electronic book reader device, the UI having a movable pointer to allow user selection of the navigational elements;
   defining a gravitational region corresponding to individual navigational elements, the gravitational region providing a visual effect to attract the pointer to the gravitational region as the pointer is moved across the corresponding navigational element;
   receiving user-controlled movement of the pointer within the UI;
   monitoring a trajectory of the pointer as the pointer is moved over the navigational elements;
   determining whether the pointer is decelerating within a particular gravitational region, wherein determining whether the pointer is decelerating within the particular gravitational region comprises determining whether the pointer is decelerating within a configurable distance relative to the gravitational region; and
   responsive to determining the deceleration, repositioning the pointer to another location within the gravitational region.

10. A method as recited in claim 1, wherein the another location comprises a calculated middle of the gravitational region.

11. A method as recited in claim 9, wherein the another location comprises a calculated middle of the gravitational region and the another location is based at least in part on the part of the navigation element visible on the display, irrespective of parts of the navigation element that may extend beyond the display.

12. A method as recited in claim 1 implemented on an electronic book reader device, the method comprising:
   presenting a user interface (UI) with one or more navigational elements on a display of the electronic book reader device, the UI having a movable pointer to allow user selection of the navigational elements;
   defining a gravitational region corresponding to individual navigational elements, the gravitational region providing a visual effect to attract the pointer to the gravitational region as the pointer is moved across the corresponding navigational element;
   receiving user-controlled movement of the pointer within the UI;
   monitoring a trajectory of the pointer as the pointer is moved over the navigational elements;
   determining whether the pointer is decelerating within a particular gravitational region; and
   responsive to determining the deceleration, repositioning the pointer to another location within the gravitational region, wherein the another location comprises a calculated middle of the gravitational region and the another location is based at least in part on the part of the navigation element visible on the display, irrespective of parts of the navigation element that may extend beyond the display.

13. A method as recited in claim 12, further comprising in an event that the pointer is not decelerating within the particular gravitational region, refraining from repositioning the graphical indication of user input from a current location to the another location.

14. A method as recited in claim 12, wherein determining whether the pointer is decelerating within the particular gravitational region comprises determining whether the pointer is decelerating within a configurable distance and/or a predetermined distance relative to the gravitational region.

15. A method comprising:
   rendering a pointer as part of a user interface (UI), the UI having one or more navigation elements each having an associated field that at least partially surrounds the navigation element;
   receiving user control of the pointer as the pointer is moved across the user interface;
   determining a trajectory of the pointer, the trajectory crossing one or more fields associated with the one or more navigation elements;
   ascertaining changes in velocity of the pointer as the pointer is moving; and
   in an event that the pointer is decelerating, repositioning the pointer from a current location to a new location, wherein the new location is within a field and substantially aligned based on the trajectory path, wherein the new location comprises a calculated middle of the field and the new location is based at least in part on the part of the navigation element visible on a display, irrespective of parts of the navigation element that may extend beyond the display.

16. A method as recited in claim 15, wherein the pointer comprises a Cursor.

17. A method as recited in claim 15, wherein the field is identified as a space covered by the navigation element.

18. A method as recited in claim 15, wherein the field is identified as a space covered by the navigation element and a predetermined amount of surrounding space.

19. A method as recited in claim 18, wherein the surrounding space is measured relative to a center of the navigation element that is visible on a display.

20. A method as recited in claim 15, wherein ascertaining the changes in the velocity of the pointer is based at least in part on the pointer being within a threshold distance of the field.

21. A method as recited in claim 20, wherein the threshold distance comprises a predetermined distance relative to the field.

22. A method as recited in claim 20, wherein the threshold distance comprises a configurable distance relative to the field.

23. A method as recited in claim 15, wherein the field is determined relative to a center of a portion of the navigation element that is visible as part of the user interface.

24. A method as recited in claim 15, wherein determining the trajectory of the pointer comprises comparing at least two locations at corresponding times while the pointer is moved across the user interface.

25. A method as recited in claim 15, wherein the new location comprises a horizontal or vertical middle of the field.

26. A method as recited in claim 15, further comprising in an event that the pointer is not decelerating within the field associated with the navigation element, refraining from repositioning the pointer from a current location to a point within the field that aligns along the trajectory path.

27. A device comprising:
 a processor;
 a memory accessible by the processor;
 a display;
 a user input mechanism; and
 a user interface application stored in the memory and executable by the processor to:
  provide a user interface having one or more navigation elements and a pointer that is movable responsive to user input across the navigation elements, the user interface having gravitational fields about individual navigation elements; and
  detect changes in velocity of the pointer as the pointer is moved through individual gravitational fields such that the user interface repositions the pointer from a first location to a second location within a certain gravitational field when the pointer decelerates within the certain gravitational field, wherein the second location comprises a calculated middle of the certain gravitational field and the second location is based at least in part on the part of a corresponding navigation element visible on a display, irrespective of parts of the corresponding navigation element that may extend beyond the display.

28. A device as recited in claim 27, wherein the device comprises an electronic book reader.

29. A device as recited in claim 27, wherein the device comprises a dedicated handheld electronic book reading device.

30. A device as recited in claim 27, wherein the display comprises an electronic paper display.

31. A device as recited in claim 27, wherein the display comprises an electronic paper display having a display update time of greater than about 15 milliseconds.

32. A nontransitory computer-readable medium having computer executable instructions encoded thereon, the computer executable instructions, upon execution configuring a processor to perform operations comprising:
 rendering a graphical indication of user input as part of a graphical user interface, the graphical user interface having one or more navigation elements each having an associated field;
 receiving user control of the graphical indication of user input as the graphical indication of user input is moved across the graphical user interface;
 determining a trajectory of the graphical indication of user input, the trajectory crossing one or more fields associated with the one or more navigation elements;
 ascertaining changes in velocity of the graphical indication of user input as the graphical indication of user input is moving; and
 in an event that the graphical indication of user input is decelerating, repositioning the graphical indication of user input from a current location to a new location, wherein the new location is within a field and based at least in part on the trajectory path, wherein the new location within the field comprises a calculated middle of the field and the new location is based at least in part on the part of the navigation element visible on a display, irrespective of parts of the navigation element that may extend beyond the display.

33. A nontransitory computer-readable medium as recited in claim 32, wherein the graphical indication of user input comprises a cursor.

34. A nontransitory computer-readable medium as recited in claim 32, wherein the graphical indication of user input comprises a changed visual representation of a pointer.

35. A nontransitory computer-readable medium as recited in claim 32, wherein the field is identified as a part of the graphical user interface covered by the navigation element.

36. A nontransitory computer-readable medium as recited in claim 35, wherein the predetermined additional part is measured relative to a center of the navigation element that is visible on a display.

37. A nontransitory computer-readable medium as recited in claim 36, wherein the threshold distance comprises a predetermined distance relative to the field.

38. A nontransitory computer-readable medium as recited in claim 36, wherein the threshold distance comprises a configurable distance relative to the field.

39. A nontransitory computer-readable medium as recited in claim 32, wherein the field is identified as a part of the graphical user interface covered by the navigation element and a predetermined additional part of the graphical user interface.

40. A nontransitory computer-readable medium as recited in claim 32, wherein ascertaining the changes in the velocity of the graphical indication of user input is based at least in part on the graphical indication of user input being within a threshold distance of the field.

41. A nontransitory computer-readable medium as recited in claim 32, wherein the field is determined relative to a center of a portion of the navigation element that is visible as part of the graphical user interface.

42. A nontransitory computer-readable medium as recited in claim 32, wherein determining the trajectory of the graphical indication of user input comprises comparing at least two locations at corresponding times while the graphical indication of user input is moved across the user interface.

43. A nontransitory computer-readable medium as recited in claim 32, wherein the new location within the field comprises a vertical middle of the field.

44. A nontransitory computer-readable medium as recited in claim 32, further comprising in an event that the graphical indication of user input is not decelerating while located within the field associated with the navigation element, refraining from repositioning the graphical indication of user input from a current location to a new location within the field based at least in part on the trajectory path.

* * * * *